United States Patent
Von Elbwart et al.

(10) Patent No.: US 6,769,085 B2
(45) Date of Patent: Jul. 27, 2004

(54) METHOD FOR MODIFYING A BIT SEQUENCE IN AN ARQ RETRANSMISSION, RECEIVER AND TRANSMITTER THEREFOR

(75) Inventors: Alexander Golitschek Edler Von Elbwart, Darmstadt (DE); Eiko Seidel, Darmstadt (DE); Christian Wengerter, Kleinheubach (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/295,899

(22) Filed: Nov. 18, 2002

(65) Prior Publication Data

US 2003/0120990 A1 Jun. 26, 2003

(30) Foreign Application Priority Data

Nov. 16, 2001 (EP) ............................................. 01127245

(51) Int. Cl.[7] ............................................... G08C 25/02
(52) U.S. Cl. ....................................... 714/748; 714/761
(58) Field of Search ................................ 370/468, 480; 375/286; 379/230; 714/748, 761

(56) References Cited

U.S. PATENT DOCUMENTS

| | | | |
|---|---|---|---|
| 4,344,171 A | | 8/1982 | Lin et al. |
| 4,495,619 A | | 1/1985 | Acampora |
| 5,524,025 A | | 6/1996 | Lawrence et al. |
| 5,914,959 A | * | 6/1999 | Marchetto et al. ........... 370/468 |
| 6,126,310 A | | 10/2000 | Osthoff et al. |
| 6,134,694 A | | 10/2000 | Uebayashi et al. |
| 6,138,260 A | | 10/2000 | Ketseoglou |
| 6,233,254 B1 | * | 5/2001 | Myers ........................ 370/480 |
| 6,247,150 B1 | | 6/2001 | Niemela ...................... 714/701 |
| 6,473,878 B1 | | 10/2002 | Wei |
| 6,476,734 B2 | | 11/2002 | Jeong et al. |
| 6,567,475 B1 | * | 5/2003 | Dent et al. ................... 375/286 |
| 6,584,190 B1 | * | 6/2003 | Bressler ...................... 379/230 |
| 6,606,355 B1 | | 8/2003 | Wei |
| 6,647,069 B1 | | 11/2003 | Segal et al. |

FOREIGN PATENT DOCUMENTS

| | | |
|---|---|---|
| EP | 0938207 | 8/1999 |
| EP | 1043858 A1 | 10/2000 |
| JP | 64055942 | 3/1989 |
| JP | 02312338 | 12/1990 |
| JP | 03274933 | 12/1991 |
| JP | 06006399 | 1/1994 |

(List continued on next page.)

OTHER PUBLICATIONS

Lin et al., "A Hybrid ARQ Scheme with Parity Retransmission for Error Control of Satellite Channels", 1982 IEEE pp. 1701–1719.*

(List continued on next page.)

*Primary Examiner*—David Ton
(74) *Attorney, Agent, or Firm*—Stevens, Davis, Miller & Mosher, LLP

(57) ABSTRACT

An ARQ transmission method in a communication system, wherein data packets comprising modulation symbols are transmitted based on an automatic repeat request and subsequently combined with previously received data packets. The symbols of the transmitted data packets are modulated in a mapping entity employing at least a first and second signal constellation. The method further comprises the step of obtaining the second signal constellation from the first signal constellation by exchanging a logical bit position and/or inverting a logical bit. The invention further relates to a corresponding transmitter and receiver.

18 Claims, 4 Drawing Sheets

FOREIGN PATENT DOCUMENTS

| JP | 6252971 | 9/1994 |
|---|---|---|
| JP | 738448 | 2/1995 |
| JP | 07143185 | 6/1995 |
| JP | 879325 | 3/1996 |
| JP | 08065279 | 3/1996 |
| JP | 09307517 | 11/1997 |
| JP | 11177648 | 7/1999 |
| JP | 2000188609 | 7/2000 |
| JP | 2000201132 | 7/2000 |

OTHER PUBLICATIONS

European Search Report dated May 31, 2002.

M. P. Schmitt, "Hybrid ARQ Scheme Employing TCM and Packet Combining", Electronics Letters, vol. 34, No. 18, Sep. 3, 1998.

K. Narayanan, et al., "A Novel ARQ Technique using the Turbo Coding Principle", IEEE Communications Letter, IEEE Service Center, vol. 1, No. 2, Mar. 1, 1997.

M. Isaka, et al., "On the design of bit–interleaved coded modulation with Turbo codes", Institute of Industrial Science, The University of Tokyo, 1999, p. 311.

M. P. Schmitt; "Improved Retransmission Strategy for Hybrid ARQ Schemes Employing TCM", IEEE 1999, pp. 1226–1228.

C. Berrou, et al.; "Near Shannon Limit Error–Correcting Coding and Decoding:Turbo–Codes(1)", IEEE 1993, pp. 1064–1070.

S. Le Goff, et al; "Turbo–Codes and High Spectral Efficiency Modulation", Telecom Bretagne, France Telecom University, IEEE 1994, pp. 645–649.

A. Burr; Modulation and Coding for Wireless Communications, Pearson Education, Prentice Hall, pp. 133–315.

International Search Report dated Oct. 16, 2001 relating to 10/239,794.

International Search Report dated Jan. 29, 2002 relating to 10/182,569.

European Search Report dated May 31, 2002 relating to 10/298,207.

Japanese Office Action dated Oct. 14, 2003 with English Translation related to Application No. 10/182,569.

US Office Action dated Dec. 8, 2003 related to Application No. 10/298,207.

Copy of Application No. 10/182,569.

Copy of Application No. 10/239,794.

Copy of Application No. 10/298,207.

"Enhanced HARQ Method with Signal Constellation Rearrangement", TSG–RAN Working Group 1 Meeting #19, Las Vegas, USA, Feb. 27–Mar. 2, 2001, Panasonic, AH24 (HSDPA), XP–002229383 pp. 1–11.

6.8 Hybrid ARQ (H–ARQ), H–ARQ with Full IR (H–ARQ–Type–II), 3G TR25.848 V0.6.0 (May 2000), TSG–RAN Working Group 1 meeting #19 Las Vegas, USA, Feb. 27–Mar. 2, 2001, pp. 30–45.

S. Kallel; "Analysis of a Type II Hybrid ARQ Scheme with Code Combining", IEEE Transactions on Communications, vol. 38, No. 8, Aug. 1990, pp. 1133–1137.

S. Kallel, et al.; "Throughput Performance of Memory ARQ Schemes", IEEE Transactions on Vehicular Technology, vol. 48, No. 3, May 1999, pp. 891–899.

D. Chase; "Code Combining–A Maximum–Likelihood Decoding Approach for Combining an Arbitrary No. of Noisy Packets", IEEE Transactions on Communications, vol. comm.–33, No. 5, May 1985, pp. 385–393.

B. A. Harvey, et al.; "Packet Combining Systems Based on the Viterbi Decoder", IEEE Transactions on Communications, vol. 42, No. 2/3/4, Feb./Mar./Apr. 1994, pp. 1544–1557.

Co–pending application PCT/EP01/01982; "Hybrid ARQ Method with Signal Constellation Rearrangement".

\* cited by examiner $i_1$ $i_2$          $i_2$

| | | | |
|---|---|---|---|
| 1011 • | 1001 • | 0001 • | 0011 • |
| 1010 • | 1000 • | 0000 • | 0010 • |
| • 1110 | • 1100 | • 0100 | • 0110 |
| • 1111 | • 1101 | • 0101 | • 0111 |

METHOD FOR MODIFYING A BIT SEQUENCE IN AN ARQ RETRANSMISSION, RECEIVER AND TRANSMITTER THEREFOR

The present invention relates to a method for modifying a bit sequence in an ARQ retransmission in a communication system. Further, the invention concerns a corresponding receiver and transmitter.

1. Field of the Invention

A common technique in communication systems with unreliable and time-varying channel conditions is to correct errors based on automatic repeat request (ARQ) schemes together with a forward error correction (FEC) technique called hybrid ARQ (HARQ). If an error is detected by a commonly used cyclic redundancy check (CRC), the receiver of the communication system requests the transmitter to resend the erroneously received data packets.

2. Background Art

S. Kallel, *Analysis of a type II hybrid ARQ scheme with code combining,* IEEE Transactions on Communications, Vol.38, No. 8, August 1990 and S. Kallel, R. Link, S. Bakhtiyari, *Throughput performance of Memory ARQ schemes,* IEEE Transactions on Vehicular Technology, Vol.48, No. 3, May 1999 define three different types of ARQ schemes:

Type I: The erroneous received packets are discarded and a new copy of the same packet is retransmitted and decoded separately. There is no combining of earlier and later received versions of that packet.

Type II: The erroneous received packets are not discarded, but are combined with additional retransmissions for subsequent decoding. Retransmitted packets sometimes have higher coding rates (coding gain) and are combined at the receiver with the stored soft-information from previous transmissions.

Type III: Is the same as Type II with the constraint each retransmitted packet is now self-decodable. This implies that the transmitted packet is decodable without the combination with previous packets. This is useful if some packets are damaged in such a way that almost no information is reusable if all transmissions carry identified data, this can be seen as a special case called HARQ Type III with a single redundancy version.

Types II and III schemes are obviously more intelligent and show a performance gain with respect to Type I, because they provide the ability to reuse information from of previously received erroneous packets. There exist basically three schemes of reusing the redundancy of previously transmitted packets:

Soft-Combining

Code-Combining

Combination of Soft- and Code-Combining

Soft-Combining

Employing soft-combining the retransmission packets carry identical information compared with the previously received information. In this case the multiple received packets are combined either by a symbol-by-symbol or by a bit-by-bit basis as for example disclosed in D. Chase, *Code combining: A maximum-likelihood decoding approach for combining an arbitrary number of noisy packets,* IEEE Trans. Commun., Vol. COM-33, pp. 385–393, May 1985 or B. A. Harvey and S. Wicker, *Packet Combining Systems based on the Viterbi Decoder,* IEEE Transactions on Communications, Vol. 42, No. 2/3/4, April 1994. By combining this soft-decision values from all received packets the reliabilities of the transmitted bits will increase linearly with the number and power of received packets. From a decoder point of view the same FEC scheme (with constant code rate) will be employed over all transmissions. Hence, the decoder does not need to know how many retransmissions have been performed, since it sees only the combined soft-decision values. In this scheme all transmitted packets will have to carry the same number of symbols.

Code-Combining

Code-combining concatenates the received packets in order to generate a new code word (decreasing code rate with increasing number of transmission). Hence, the decoder has to be aware of the FEC scheme to apply at each retransmission instant. Code-combining offers a higher flexibility with respect to soft-combining, since the length of the retransmitted packets can be altered to adapt to channel conditions. However, this requires more signaling data to be transmitted with respect to soft-combining.

Combination of Soft- and Code-Combining

In case the retransmitted packets carry some symbols identical to previously transmitted symbols and some code-symbols different from these, the identical code-symbols are combined using soft-combing as described in the section titled "Soft Combining" while the remaining code-symbols will be combined using code-combining. Here, the signaling requirements will be similar to code-combining.

As it has been shown in M. P. Schmitt, *Hybrid ARQ Scheme employing TCM and Packet Combining,* Electronics Letters Vol. 34, No. 18, September 1998 that HARQ performance for Trellis Coded Modulation (TCM) can be enhanced by rearranging the symbol constellation for the retransmissions. There, the performance gain results from the maximizing the Euclidean distances between the mapped symbols over the retransmissions, because the rearrangement has been performed on a symbol basis.

Considering high-order modulation schemes (with modulation symbols carrying more than two bits) the combining methods employing soft-combining have a major drawback: The bit reliabilities within soft-combined symbols will be in a constant ratio over all retransmissions, i.e. bits which have been less reliable from previous received transmissions will still be less reliable after having received further transmissions and, analogous, bits which have been more reliable from previous received transmissions will still be more reliable after having received further transmissions.

The varying bit reliabilities evolve from the constraint of two-dimensional signal constellation mapping, where modulation schemes carrying more than 2 bits per symbol cannot have the same mean reliabilities for all bits under the assumption that all symbols are transmitted equally likely. The term mean reliabilities is consequently meant as the reliability of a particular bit over all symbols of a signal constellation.

Employing a signal constellation for a 16 QAM modulation scheme according to FIG. 1 showing a Gray encoded signal constellation with a given bit-mapping order $i_1q_1i_2q_2$, the bits mapped onto the symbols differ from each other in mean reliability in the first transmission of the packet. In more detail, bits $i_1$ and $q_1$ have a high mean reliability, as these bits are mapped to half spaces of the signal constellation diagram with the consequences that their reliability is independent from the fact of whether the bit transmits a one or a zero.

In contrast thereto, bits $i_2$ and $q_2$ have a low mean reliability, as their reliability depends on the fact of whether they transmit a one or a zero. For example, for bit $i_2$, ones are mapped to outer columns, whereas zeros are mapped to inner columns. Similarly, for bit $q_2$, ones are mapped to outer rows, whereas zeros are mapped to inner rows.

For the second and each further retransmissions the bit reliabilities will stay in a constant ratio to each other, which is defined by the signal constellation employed in the first transmission, i.e. bits $i_1$ and $q_1$ will always have a higher mean reliability than bits $i_2$ and $q_2$ after any number of retransmissions.

In co-pending PCT/EP01/01982 a method has been suggested that in order to enhance the decoder performance, it would be quite beneficial to have equal or near to equal mean bit reliabilities after each received transmission of a packet. Hence, the bit reliabilities are tailored over the retransmissions in a way that the mean bit reliabilities get averaged out. This is achieved by choosing a predetermined first and at least second signal constellation for the transmissions, such that the combined mean bit reliabilities for the respective bits of all transmissions are nearly equal.

Hence, the signal constellation rearrangement results in a changed bit mapping, wherein the Euclidean distances between the modulation symbols can be altered from retransmission to retransmission due to the movement of the constellation points. As a result, the mean bit reliabilities can be manipulated in a desired manner and averaged out to increase the performance the FEC decoder at the receiver.

In the solution proposed above, the benefits of the constellation rearrangement are realized through a parameterized bit-to-symbol mapping entity. For complexity or efficient implementational reasons, it may be advantageous for a communication system to have a non-parameterized standard mapping entity.

SUMMARY OF THE INVENTION

Consequently, the object of the present invention resides in providing an ARQ transmission method, a transmitter and a receiver with an improved error correction performance without a parameterized bit-to-symbol mapping entity.

This object is solved by a method comprising the steps as defined in claim 1. Further, the object is solved by a transmitter and receiver as defined by the independent claims.

The idea underlying the present invention is to modify the input bit sequence prior to entry of same into the mapping entity. This modification of the signal constellation can be achieved by using an interleaver and a logical bit inverter, which invert and/or exchange the positions of the signal constellation bits dependent on the retransmission number parameter m. Hence, the beneficial effects of a constellation rearrangement are achieved without the need for a parameterized bit to symbol mapping entity. As a result, the sequence which is output after processing by the interleaver the logical bit inverter and a non-parameterized standard mapping entity is indistinguishable from the output of a parameterized bit to symbol mapping entity employing various constellation rearrangement schemes.

For a better understanding of the invention, preferred embodiments will be described in the following with reference to the accompanying drawings.

BRIEF DESCRIPTION OF THE DRAWINGS

FIG. 1 is an exemplary signal constellation for illustrating a 16 QAM modulation scheme with Gray encoded bit symbols.

DETAILED DESCRIPTION OF EMBODIMENTS

Figure 2:
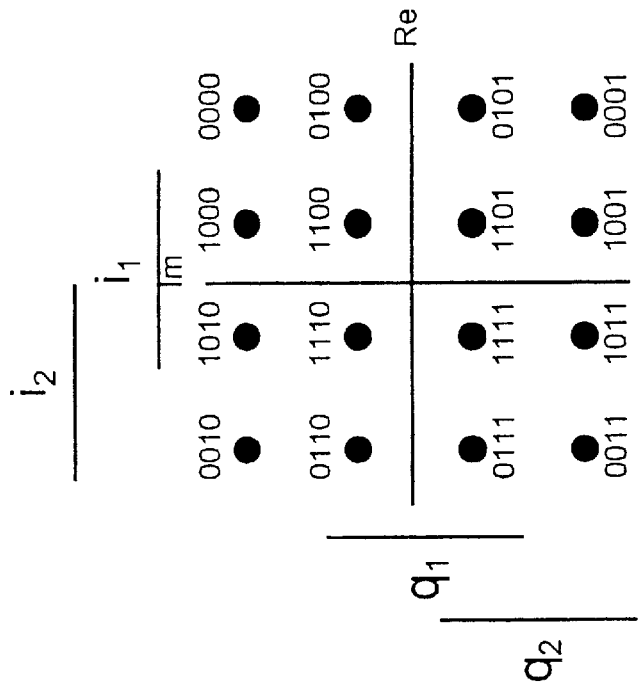
FIGS. 2a–2b show four examples for signal constellations for a 16 QAM modulation scheme with Gray encoded bit symbols.
Figure 2:
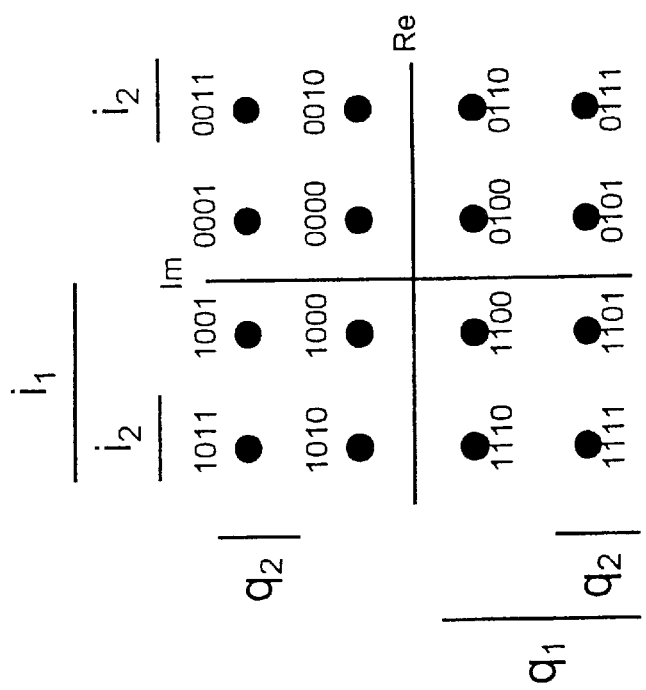
Figure 2:
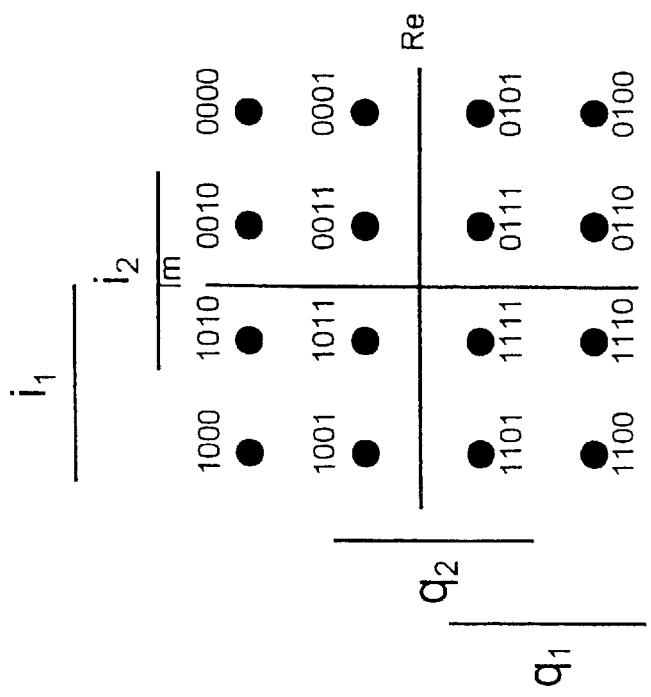
Figure 2:
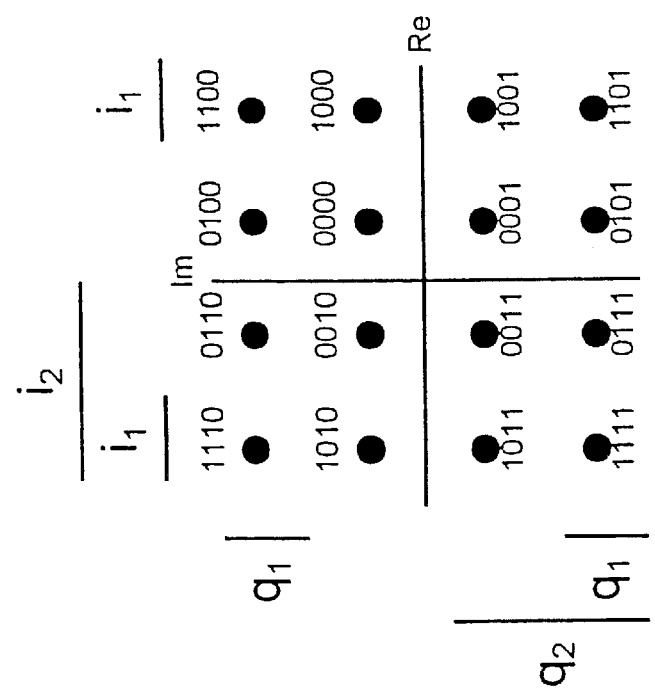

In the following the concept of a Log-Likelihood-Ratio (LLR) will be described as a metric for the bit reliabilities. First the straight forward calculation of the bit LLRs within the mapped symbols for a single transmission will be shown. Then the LLR calculation will be extended to the multiple transmission case.

Single Transmission

The mean LLR of the i-th bit $b_n^i$ under the constraint that symbol $s_n$ has been transmitted for a transmission over a channel with additive white gaussian noise (AWGN) and equally likely symbols yields $$LLR_{b_n^i|r_n}(r_n) = \log\left[\sum_{(m|b_m^i=b_n^i)} e^{-\frac{E_x}{N_0}d_{n,m}^2}\right] - \log\left[\sum_{(m|b_m^i \neq b_n^i)} e^{-\frac{E_x}{N_0}d_{n,m}^2}\right], \quad (1)$$

where $r_n=s_n$ denotes the mean received symbol under the constraint the symbol $s_n$ has been transmitted (AWGN case), $d_{n,m}^2$ denotes the square of the Euclidean distance between the received symbol $r_n$ and the symbol $s_m$, and $E_S/N_0$ denotes the observed signal-to-noise ratio.

It can be seen from Equation (1) that the LLR depends on the signal-to-noise ratio $E_S/N_0$ and the Euclidean distances $d_{n,m}$ between the signal constellation points.

Multiple Transmissions

Considering multiple transmissions the mean LLR after the k-th transmission of the i-th bit $b_n^i$ under the constraint that symbols $s_n^{(j)}$ have been transmitted over independent AWGN channels and equally likely symbols yields $$LLR_{b_n^i|\bigcap_{j=1}^k r_n^{(j)}}(r_n^{(1)}, r_n^{(2)}, \ldots, r_n^{(k)}) = \qquad (2)$$

$$\log\left[\sum_{(m|b_m^i=b_n^i)} e^{-\sum_{j=1}^k \left(\frac{E_x}{N_0}\right)^{(j)}\cdot(d_{n,m}^{(j)})^2}\right] -$$

$$\log\left[\sum_{(m|b_m^i \neq b_n^i)} e^{-\sum_{j=1}^k \left(\frac{E_x}{N_0}\right)^{(j)}\cdot(d_{n,m}^{(j)})^2}\right],$$

where j denotes the j-th transmission ((j−1)-th retransmission). Analogous to the single transmission case the mean LLRs depend on the signal-to-noise ratios and the Euclidean distances at each transmission time.

If no constellation rearrangement is performed the Euclidean distances $d_{n,m}^{(j)}=d_{n,m}^{(1)}$ are constant for all transmissions and, hence, the bit reliabilities (LLRs) after k transmissions will be defined by the observed signal-to-noise ratio at each transmission time and the signal constellation points from the first transmission. For higher level modulation schemes (more than 2 bits per symbol) this results in varying mean LLRs for the bits, which in turn leads to different mean bit reliabilities. The differences in mean reliabilities remain over all retransmissions and lead to a degradation in decoder performance.

In the following, the case of a 16-QAM system will be exemplarily considered resulting in 2 high reliable and 2 low reliable bits, where for the low reliable bits the reliability depends on transmitting a one or a zero (see FIG. 1). Hence, overall there exist 2 levels of mean reliabilities, whereby the second is further subdivided.

Level 1 (High Reliability, 2 bits): Bit mapping for ones (zeros) separated into the positive (negative) real half space for the i-bits and the imaginary half space the q-bits. Here, there is no difference whether the ones are mapped to the positive or to the negative half space.

Level 2 (Low Reliability, 2 bits): Ones (zeros) are mapped to inner (outer) columns for the i-bits or to inner (outer) rows for the q-bits. Since there is a difference for the LLR depending on the mapping to the inner (outer) columns and rows, Level 2 is further classified:

Level 2a: Mapping of $i_n$ to inner columns and $q_n$ to inner rows respectively.

Level 2b: Inverted mapping of Level 2a: Mapping of $i_n$ to outer columns and $q_n$ to outer rows respectively.

To ensure an optimal averaging process over the transmissions for all bits the levels of reliabilities have to be altered.

It has to be considered that the bit-mapping order is open prior initial transmission, but has to remain through retransmissions, e.g. bit-mapping for initial transmission: $i_1 q_1 i_2 q_2 \rightarrow$ bit-mapping all retransmissions: $i_1 q_1 i_2 q_2$.

Some examples for possible constellations are shown in FIG. 2. The resulting bit reliabilities according to FIG. 2 are given in Table 1.

TABLE 1

| Constellation | bit $i_1$ | bit $q_1$ | bit $i_2$ | bit $q_2$ |
|---|---|---|---|---|
| 1 | High Reliability (Level 1) | High Reliability (Level 1) | Low Reliability (Level 2b) | Low Reliability (Level 2b) |
| 2 | Low Reliability (Level 2a) | Low Reliability (Level 2a) | High Reliability (Level 1) | High Reliability (Level 1) |
| 3 | Low Reliability (Level 2b) | Low Reliability (Level 2b) | High Reliability (Level 1) | High Reliability (Level 1) |
| 4 | High Reliability (Level 1) | High Reliability (Level 1) | Low Reliability (Level 2a) | Low Reliability (Level 2a) |

In the following, it is assumed that m denotes the retransmission number parameter, with m=0 denoting the first transmission of a packet in the ARQ context. Further let b denote the number of bits that form a symbol in the mapping entity. Typically, b can be any integer number, where the most often used values for communication systems are an integer power of 2.

Without loss of generality it can be further assumed that the number of bits n that are used as input to the interleaving process is dividable by b, i.e. n is an integer multiple of b. Those skilled in the art will perceive that if this should not be the case, then the sequence of input bits can be easily appended by dummy bits until the above condition is met.

As described above, for a given modulation, several reliability levels can be identified. The interleaving process should thus average out the reliabilities of the b bits over the retransmissions such that all b bits are in average equally reliable. This means that the interleaver has to change the positions of the b bits within a symbol (also termed "wrapping" in the art) such that each of the original bits is mapped as often to all reliability levels as every other of the b bits. This means that the interleaving is an intra-symbol bit interleaving process.

Additionally, there can be several bit positions for which the reliabilities depend on the logical bit value (low or high). When a bit is mapped for the non-first time on such a position, this bit should also be logically inverted.

With these rules, patterns can be constructed which determine the interleaver and inverter process for a transmission number m.

In theory, the perfect averaging out of the reliabilities might be possible only after an infinite or very high number of retransmissions. In these cases, there might thus be several alternatives which differ in the sequence of interleaver or inverter patterns. Which of these alternatives is chosen is left open to the choice of the system designer, since it will mean no difference in performance.

If the signal constellation as in FIG. 1 is to be kept, in order to get constellation 2 form constellation 1 in FIG. 2, the following processes have to be executed, where the order is irrelevant:

exchange positions of original bits $i_1$ and $i_2$ exchange positions of original bits $q_1$ and $q_2$ logical bit inversion of original bits $i_1$ and $q_1$ Alternatively, those bits that end in positions 1 and 2 can also be inverted.

An example dependent on the transmission number is given in the following table, where the bits always refer to the first transmission, and a long dash above a character denotes logical bit inversion of that bit:

TABLE 2

| Constellation number | Interleaver and Inverter functionality |
|---|---|
| 1 | $i_1 q_1 i_2 q_2$ |
| 2 | $i_2 q_2 \bar{i}_1 \bar{q}_1$ or $\bar{i}_2 \bar{q}_2 i_1 q_1$ |
| 3 | $i_2 q_2 i_1 q_1$ or $\bar{i}_2 \bar{q}_2 \bar{i}_1 \bar{q}_1$ |
| 4 | $i_1 q_1 \bar{i}_2 \bar{q}_2$ or $\bar{i}_1 \bar{q}_1 i_2 q_2$ |

The first given examples in each row of table 2 correspond to the constellations given in FIG. 2. As readily apparent from table 2, signal constellation 2 is obtained from constellation 1 by exchanging (swapping) the positions of bits $i_1$ and $i_2$ as well as that of bits $q_1$ and $q_2$ and by inverting either bit pair $i_1$, $q_1$ or all bits. Similarly, signal constellation 3 is obtained from constellation 1 by exchanging positions of bits $i_1$ and $i_2$ as well as that of bits $q_1$ and $q_2$ with each other respectively and by inverting bit pair $i_2$, $q_2$ in one alternative. In the other alternative, only the bit positions are exchanged and no inversion is necessary. Finally, signal constellation 4 is obtained from constellation 1 by inverting either bit pair $i_2$, $q_2$ or all bits of the symbol without exchanging any bit position.

From this, it can be chosen between different strategies for transmission numbers (non-exhaustive):

TABLE 3

| Transmission Number | Constellation Number | Constellation Number | Constellation Number | Constellation Number | Constellation Number | Constellation Number |
|---|---|---|---|---|---|---|
| 1 | 1 | 1 | 1 | 1 | 1 | 1 |
| 2 | 2 | 2 | 3 | 4 | 4 | 3 |

TABLE 3-continued

| Transmission Number | Constellation Number | Constellation Number | Constellation Number | Constellation Number | Constellation Number | Constellation Number |
| --- | --- | --- | --- | --- | --- | --- |
| 3 | 3 | 4 | 2 | 2 | 3 | 4 |
| 4 | 4 | 3 | 4 | 3 | 2 | 2 |

Figure 3:
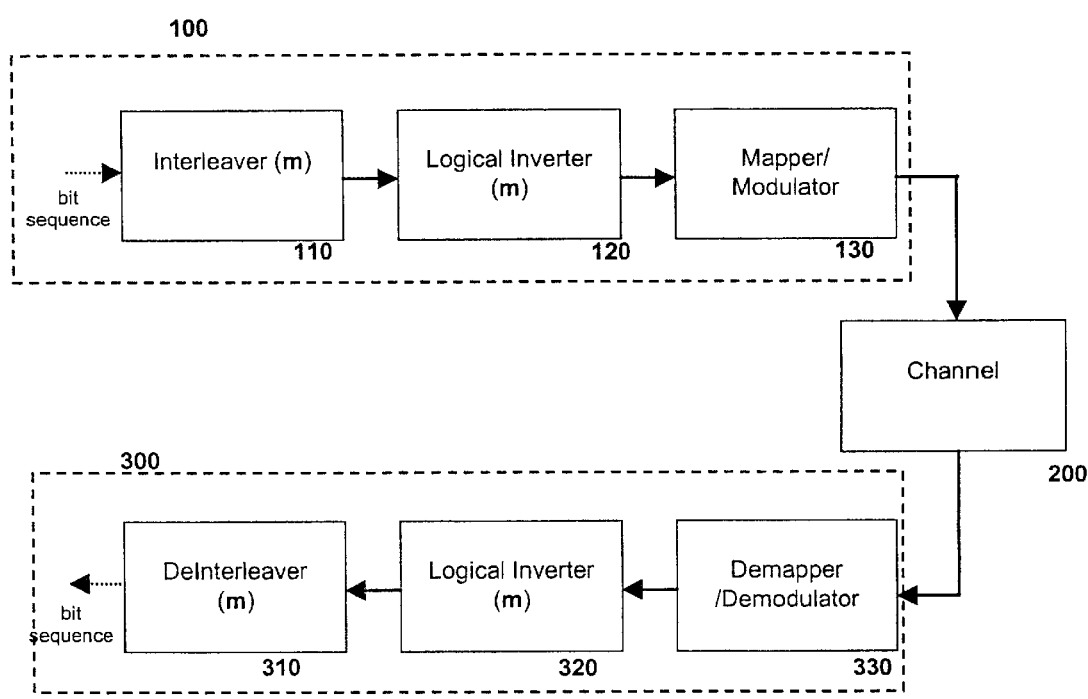
FIG. 3 is an exemplary embodiment of a communication system in which the method underlying the invention is employed.

FIG. 3 shows an exemplary embodiment of a communication system in which the method underlying the invention is employed.

At the transmitter 100, a bit sequence is obtained from a forward error correction (FEC) encoder (not shown) and subsequently input into an interleaver 110 and a logical bit inverter 120. The interleaver 110 and logical bit inverter are each dependent on the retransmission number parameter m and modify the input bit sequence. Subsequently, the bit sequence is input into the mapper/modulator 130 being a non-parameterized standard mapping entity. The mapper typically uses one of the signal constellations shown in FIG. 2 and maps the b bits onto a symbol which is transmitted over the communication channel 200. The communication channel is typically a radio communication channel experiencing unreliable and time-varying channel conditions.

The interleaving/inverting patterns is either stored at both, the transmitter and the receiver or stored at the transmitter and signalled to the receiver.

At the receiver 300, the complex symbols are first input into a de-mapper/demodulator 330 which demodulates the received symbols into a corresponding bit domain sequence (e.g. sequence of LLRs). This sequence is then input into a logical inverter 320 and subsequently into a de-interleaver 310 from which the obtained bit domain sequence is output.

The interleaver and de-interleaver operate in accordance with the well known technique of interleaving/deinterleaving by applying a determined, pseudo-random or random permutation of the input bit or symbol sequences, i.e. exchange (swap) the positions of the bits or symbols within a sequence. In the above described embodiment, the interleaver is a intra-symbol bit interleaver which changes the position of the bits that form a symbol in the mapping entity.

The logical bit inverter operates in accordance with a well known technique of inverting the logical value of a bit, i.e. turns a logical low to a logical high value and vice versa. In a practical realization for a receiver working with log likelihood ratios, this inverting operation is equivalent to a sign inversion of the log likelihood ratio. If a retransmission is launched by an automatic repeat request issued by an error detector (not shown) with the result that an identical data packet is transmitted from the transmitter 100, in the de-mapper/demodulator 330, the previously received erroneous data packets are soft-combined with the retransmitted data packets. Due to the modification of the bit sequence by the interleaver and the logical bit inverter, the mean bit reliabilities are averaged out resulting in an increased performance in the receiver.

Although the method described above has been described using Gray-encoded signals and a QAM modulation scheme, it is clear to a skilled person that other suitable encoding and modulation schemes can be equally used in obtaining the benefits of the invention.

What is claimed is:

1. A transmission apparatus comprising:
   a transmission section that (i) transmits a first data arranged in a first 16 QAM constellation pattern in a first transmission, and (ii) retransmits a second data arranged in a second 16 QAM constellation pattern in a retransmission, wherein said second 16 QAM constellation pattern is a rearrangement of said first 16 QAM constellation pattern, and maid rearrangement includes an inversion of a logical bit value for a part of said second data, and wherein, in said first transmission, a bit sequence ($i_1 q_1 i_2 q_2$) is used as said first 16 QAM constellation pattern, and, in said retransmission, said bit sequence is modified, to obtain said second 16 QAM constellation pattern, by exchanging positions of $i_1$ and $i_2$, by exchanging positions of $q_1$ and $q_2$, and by logically inverting $i_1$ and $q_1$.

2. A transmission apparatus comprising:
   a transmission section that (i) transmits a first data arranged in a first 16 QAM constellation pattern in a first transmission, and (ii) retransmits a second data arranged in a second 16 QAM constellation pattern in a retransmission, wherein said second 16 QAM constellation pattern is a rearrangement of said first 16 QAM constellation pattern, and said rearrangement includes an inversion of a logical bit value for a part of said second data, and wherein, in said first transmission, a bit sequence ($i_1 q_1 i_2 q_2$) is need as said first 16 QAM constellation pattern, and, in said retransmission, said bit sequence is modified, to obtain said second 16 QAM constellation pattern, by exchanging positions of $i_1$ and $i_2$, by exchanging positions of $q_1$ and $q_2$, and by logically inverting $i_2$ and $q_2$.

3. A transmission apparatus comprising:
   a transmission section that (i) transmits a first data arranged in a first 16 QAM constellation pattern in a first transmission, and (ii) retransmits a second data arranged in a second 16 QAM constellation pattern in a retransmission, wherein said second 16 QAM constellation pattern is a rearrangement of said first 16 QAM constellation pattern, and said rearrangement includes an inversion of a logical bit value for a part of said second data, and wherein, in said first transmission, a bit sequence ($i_1 q_1 i_2 q_2$) is used as said first 16 QAM constellation pattern, and, in said retransmission, said bit sequence is modified, to obtain said second 16 QAM constellation pattern, by logically inverting $i_2$ and $q_2$.

4. The transmission apparatus according to claim 1, 2 or 3, wherein said rearrangement is performed such that a mean bit reliability for each bit mapped onto a symbol is averaged out through repetition provided by said retransmission.

5. The transmission apparatus according to claim 1, 2 or 3, wherein the data is Gray encoded.

6. A base station apparatus equipped with the transmission apparatus according to claim 1, 2 or 3.

7. A communication terminal apparatus equipped with the transmission apparatus according to claim 1, 2 or 3.

8. A transmission method comprising:
   transmitting a first data arranged in a first 16 QAM constellation pattern in a first transmission; and
   retransmitting a second data arranged in a second 16 QAM constellation pattern in a retransmission, wherein:

said second 16 QAM constellation pattern is a rearrangement of said first 16 QAM constellation pattern, said rearrangement includes an inversion of a logical bit value for a part of said second data, in said first transmission, a bit sequence ($i_1q_1i_2q_2$) is used as said first 16 QAM constellation pattern, and in said retransmission, said bit sequence is modified, to obtain said second 16 QAM constellation pattern, by exchanging positions of $i_1$ and $i_2$, by exchanging positions of $q_1$ and $q_2$ and by logically inverting $i_1$ and $q_1$.

9. A transmission method comprising:

transmitting a first data arranged in a first 16 QAM constellation pattern in a first transmission; and retransmitting a second data arranged in a second 16 QAM constellation pattern in a retransmission, wherein:

said second 16 QAM constellation pattern is a rearrangement of said first 16 QAM constellation pattern, said rearrangement includes an inversion of a logical bit value for a part of said second data, in said first transmission, a bit sequence ($i_1q_1i_2q_2$) is used as said first 16 QAM constellation pattern, and in said retransmission, said bit sequence is modified, to obtain said second 16 QAM constellation pattern, by exchanging positions of $i_1$ and $i_2$, by exchanging positions of $q_1$ and $q_2$, and by logically inverting $i_2$ and $q_2$.

10. A transmission method comprising:

transmitting a first data arranged in a first 16 QAN constellation pattern in a first transmission; and retransmitting a second data arranged in a second 16 QAM constellation pattern in a retransmission, wherein:

said second 16 QAM constellation pattern is a rearrangement of said first 16 QAM constellation pattern, said rearrangement includes an inversion of a logical bit value for a part of said second data, in said first transmission, a bit sequence ($i_1q_1i_2q_2$) is used as said first 16 QAM constellation pattern, and in said retransmission, said bit sequence is modified, to obtain said second 16 QAM constellation pattern, by logically inverting $i_2$ and $q_2$.

11. A transmission apparatus comprising:

a transmission section that (i) transmits a first data mapped based on a first 16 QAM constellation pattern in a first transmission, and (ii) retransmits a second data mapped based on a second 16 QAM constellation pattern in a retransmission, wherein said second 16 QAM constellation pattern is obtained, as an arranged pattern of a bit sequence ($i_1q_1i_2q_2$), by exchanging positions of $i_1$ and $i_2$, by exchanging positions of $a_1$ and $q_2$, and by logically inverting $i_1$ and $q_1$.

12. A transmission apparatus comprising:

a transmission section that (i) transmits a first data mapped based on a first 16 QAM constellation pattern in a first transmission, and (ii) retransmits a second data mapped based on a second 16 QAM constellation pattern in a retransmission, wherein said second 16 QAM constellation pattern is obtained, as an arranged pattern of a bit sequence ($i_1q_1i_2q_2$), by exchanging positions of $i_1$ and $i_2$, by exchanging positions of $q_1$ and $q_2$, and by logically inverting $i_2$ and $q_2$.

13. A transmission apparatus comprising:

a transmission section that (i) transmits a first data mapped based on a first 16 QAM constellation pattern in a first transmission, and (ii) retransmits a second data mapped based on a second 16 QAM constellation pattern in a retransmission, wherein said second 16 QAM constellation pattern is obtained, as an arranged pattern of a bit sequence ($i_1q_1i_2q_2$), by logically inverting $i_2$ and $q_2$.

14. A communication terminal apparatus equipped with the transmission apparatus according to claim 11, 12 or 13.

15. A base station apparatus equipped with the transmission apparatus according to claim 11, 12 or 13.

16. A transmission method comprising:

transmitting a first data mapped based on a first 16 QAM constellation pattern in a first transmission, and retransmitting a second data mapped based on a second 16 QAM constellation pattern in a retransmission, wherein:

said second 16 QAM constellation pattern is obtained, as an arranged pattern of a bit sequence ($i_1q_1i_2q_2$), by exchanging positions of $i_1$ and $i_2$, by exchanging positions of $q_2$ and $q_2$, and by logically inverting $i_1$ and $q_1$.

17. A transmission method comprising:

transmitting a first data mapped based on a first 16 QAM constellation pattern in a first transmission, and retransmitting a second data mapped based on a second 16 QAM constellation pattern in a retransmission, wherein:

said second 16 QAM constellation pattern is obtained, as an arranged pattern of a bit sequence ($i_1q_1i_2q_2$), by exchanging positions of $i_1$ and $i_2$, by exchanging positions of $q_1$ and $q_2$, and by logically inverting $i_2$ and $q_2$.

18. A transmission method comprising:

transmitting a first data mapped based on a first 16 QAM constellation pattern in a first transmission, and retransmitting a second data mapped based on a second 16 QAM constellation pattern in a retransmission, wherein:

said second 16 QAM constellation pattern is obtained, as an arranged pattern of a bit sequence ($i_1q_1i_2q_2$), by logically inverting $i_2$ and $q_2$.

\* \* \* \* \*